UNITED STATES PATENT OFFICE 2,559,465

SOLUBLE COPOLYMERS OF POLYMERIZABLE MONOMERS AND DRYING OIL ACIDS-UNSATURATED DICARBOXYLIC ACID-POLYHYDRIC ALCOHOL ESTERS AND PROCESS OF MAKING THEM

Frank B. Root, Montclair, N. J., assignor to Ellis-Foster Company, a corporation of New Jersey No Drawing. Application September 24, 1947, Serial No. 775,952

18 Claims. (Cl. 260—22)

This invention relates to soluble copolymers of a polymerizable compound containing a single $>C=CH_2$ group and a drying oil acids-unsaturated alpha-beta dicarboxylic acid-polyhydric alcohol ester. In particular it relates to a soluble ester formed from a monohydroxyl-containing polyhydric alcohol-drying oil acids ester, and the polymer resulting from the conjoint polymerization of a liquid monomeric unsaturated polymerizable compound containing a single ethylenic linkage and an unsaturated dicarboxylic acid half-ester of said monohydroxy ester.

It is known that a compound containing the group —CH=CH—CO—, such as maleic anhydride or esters thereof, can copolymerize with a compound containing an active $>C=CH_2$ group. If each reactant contains a single reactive double bond, soluble and fusible copolymers comprising linear molecules are formed. If one or more of the reactants contains more than one reactive double bond, infusible and insoluble gelled products are obtained which are hard or soft depending upon the type of reactants. The usual alkyd resins containing unsaturated alpha-beta dicarboxylic acid radicals copolymerize with $>C=CH_2$ compounds and form insoluble and infusible masses because such products predominantly consist of molecules containing a plurality of unsaturated dicarboxylic acid radicals.

In the copending application of Root and Wells, Serial No. 662,607, filed April 16, 1946 (abandoned), there are described and claimed soluble copolymers resulting from the polymerization of a mixture of a compound containing a single $>C=CH_2$ group and an unsaturated dicarboxylic acid reaction product consisting predominantly of an ester having only one unsaturated dicarboxylic acid radical per molecule and being of the formula $$D_{n-1}P—U—PD_{n-1}$$

where D represents the acid radical of an acid obtained from a drying or semi-drying oil, P is the residue after loss of hydroxyl groups from an esterifiable polyhydric alcohol $P(OH)_n$ of which $n$ is the number of hydroxyl groups, and U is the acid radical of an alpha-unsaturated alpha-beta dicarboxylic acid. This ester is preferably prepared by forming a hydroxyl-containing ester of a polyhydric alcohol and drying oil acids and subsequently esterifying this with an unsaturated dicarboxylic acid. As is known, esterifications of the alkyd type generally lead to complex mixtures of products. It is, therefore, essential to use proportions of reactants and conditions which discourage the formation of esters containing more than one unsaturated dicarboxylic acid radical per molecule, otherwise an insoluble final copolymer results. The alkyd ester obtained by controlled conditions of temperature, time and proportions of reactants yields a soluble copolymer with a polymerizable compound such as styrene when the proportion of the latter is from 1 to 15% of the ester. The process disclosed herein represents an improvement whereby the proportion of $>C=CH_2$ compound can be varied over a wide range. It is believed that the reason for this is that the formation of esters containing more than one unsaturated dicarboxylic acid radical per molecule is more completely suppressed.

It is an object of this invention to provide a process whereby soluble copolymers can be obtained from a wide range of proportions of polymerizable $>C=CH_2$ compounds. It is also an object to produce soluble copolymerized drying oil esters having improved drying characteristics and capable of forming coating compositions having high durability, and water-resistance. Other objects will be apparent from the detailed description which follows.

The process leads to a final product which is essentially the copolymer of a polymerizable compound containing a single $>C=CH_2$ group and a polyhydric alcohol esterified with drying oil fatty acids and an unsaturated dicarboxylic acid, and may be represented by the formula

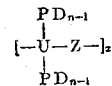

where P is the residue of the polyhydric alcohol $P(OH)_n$, D is the acid radical of drying oil acids, U is the acid radical of the unsaturated dicarboxylic acid, Z represents the polymerizable $>C=CH_2$ compound, and $x$ is a large number equal to the degree of polymerization. The process comprises essentially the steps of (1) forming a monohydroxyl ester of drying oil acids and polyhydric alcohol ($D_{n-1}POH$), (2) reacting 2 moles of this compound with 1 mole of unsaturated dicarboxylic acid anhydride under conditions to form a half-ester, the reaction resulting in an esterifiable mixture of $D_{n-1}POH$ and $D_{n-1}—P—U(H)$, (3) adding the copolymerizable compound containing a single ethylenic linkage and heating the mixture under polymerizing but non-esterifying conditions to get the copolymer of the dicarboxylic acid half-ester

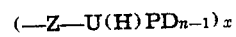

in mixture with the monohydroxy ester

and finally (4) heating the mixture under esterifying conditions to esterify the carboxylic groups of the copolymer with the monohydroxy ester.

1. In forming the monohydroxyl-containing compound, the reaction involves $n-1$ moles of drying oil acids and 1 mole of polyhydric alcohol. As in all reactions in which a polyfunctional compound enters, a mixture of esters is possible and it is of utmost importance that the reaction product consists essentially of monohydroxy esters. Esters containing more than one hydroxyl group must be at a minimum or non-influential amount, otherwise gelation will occur in the final esterification step before the acid number is adequately lowered. Also, polyhydroxy compounds may form half-esters with the unsaturated dicarboxylic anhydride in the second step, which contain more than one unsaturated dicarboxylic acid group, and lead to premature gelation in the polymerization step. The reaction product from this step must be free from an influential amount of esters containing more than one hydroxyl group.

In general the reaction of $n-1$ moles of drying oil acids with 1 mole of polyhydric alcohol at a temperature between 190 and 250° C. produces a satisfactory hydroxyl-containing ester product although, for certain purposes, particularly with a polyhydric alcohol which contains a relatively large number of hydroxyl groups such as pentaerythritol or polypentaerthritol, a slight excess (about 0.1 mole) of monocarboxylic acid may be used to advantage. This reduces the probability of free polyhydric alcohol and esters containing more than one hydroxyl group. Also, the reaction temperature must not be high enough to produce any substantial polymerization of the drying oil ester, since the intermolecular polymerization product contains more than one hydroxyl group and tends to cause gelation in the final step. A temperature below about 250° C. is suitable for making the hydroxyl ester.

In place of drying oil acids, the drying oils themselves may be alcoholized with glycerol or other polyhydric alcohol to form a monohydroxy ester. The drying oils and the acids therefrom are unpolymerized and include those containing substantially no conjugated unsaturation such as linseed, soya bean, sunflower seed, walnut, perilla, etc. Suitable esterifiable polyhydric alcohols are glycerol, polyglycerol, glycols and polyglycols (ethylene glycol, diethylene glycol, etc.), pentaerythritol, polypentaerythritol, trimethylol propane, etc.

2. The monohydroxy drying oil fatty acids-polyhydric alcohol ester is heated with an unsaturated dicarboxylic acid anhydride such as maleic, chloromaleic, itaconic or citranconic anhydride. The corresponding acids may be used, if desired, since they break down readily into the anhydride. The reaction proceeds rapidly even at temperatures below 200° C. Thus, the time and temperature in this step are inadequate to cause esterification or any reaction other than addition of the anhydride to the hydroxy ester with formation of the dicarboxylic acid half-ester. When 1 mole of unsaturated dicarboxylic anhydride and 2 moles of the monohydroxy ester are used the result is an esterifiable mixture of equal moles of the monohydroxy ester and its dicarboxylic acid half-ester. No molecules containing more than one unsaturated dicarboxylic acid radical are possible except what might result in minute amount from traces of esters containing more than one hydroxyl group unavoidably derived from the first step. While the ratio of acid anhydride to monohydroxy ester is preferably 1 mole to 2 moles, since an excess of hydroxyl groups insures reaction of all the acid anhydride, more or less of the anhydride may be used, as is explained later. Also, where a slight excess of drying oil acids is used in the first step, the proportion of acid anhydride may be correspondingly diminished if a final low acid number is essential.

The temperature for the second step is between about 140° and 200° C. and preferably between 170° and 180° C. At the latter temperature half-ester formation occurs in a short time (e. g., less than 30 minutes at 170° C.).

3. The next step is copolymerization of the unsaturated dicarboxylic acid half-ester of the mixture with a liquid monomeric unsaturated polymerizable compound in which the unsaturation is due to a single terminal ethylenic linkage $>C=CH_2$. The latter compound may be a monohydric alcohol ester of acrylic or methacrylic acid, acrylonitrile, a vinyl ester of a saturated monocarboxylic acid (e. g., vinyl acetate), styrene, a monovinyl ether, or a monobasic acid ester of allyl or methallyl alcohol. The most available compound is styrene. The proportion of such compound may be varied over a wide range. For example, the polymerization mixture may comprise 5% of polymerizable $>C=CH_2$ compound and 95% of the esterifiable ester mixture, and extend to about 90% $>C=CH_2$ compound and 10% of the esterifiable ester mixture. Thus, coating compositions of varied oil-length are possible.

The temperature required for copolymerization is below 200° C. and is preferably between about 120° and 170° C., depending upon the boiling point of the $>C=CH_2$ compound. The reaction may be carried out under pressure, if desired, and also in the presence of about 1% or less of a polymerization catalyst such as benzoyl peroxide, acetyl peroxide, lauryl peroxide, tertiary butyl hydroperoxide, etc.

After polymerization has proceeded until the viscosity no longer increases or increases very slowly, the solution is heated to drive off any unpolymerized compounds, which may be thus recovered.

4. Esterification to form the final product is carried out at 200° C. or higher. Since the reaction at this stage is theoretically between a monohydroxy compound and a polycarboxylic compound, the polyester is of the linear type and does not reach an infusible gel stage through esterification. However, if an influential amount of esters containing more than one hydroxyl group is present, the mixture would naturally form a gel before the acid number is adequately lowered. A gel is formed on long heating through the normal bodying reaction of drying oil acid polyesters and the esterification is carried out as long as is necessary to obtain a soluble final ester of low acid number. The acid number is preferably below 20.

If desired, the final esterification step may be carried out in the presence of other substances such as oil-soluble resins, drying oils, mixtures of drying oils and resins, or waxes. Since copolymerization results in the substantial disappearance of the unsaturation of the dicarboxylic acid radicals, these other substances may include material containing conjugated double bonds such as tung oil or rosin.

In the second step the unsaturated dicarboxylic acid anhydride reacts only to form a half-ester. No diene reaction with the drying oil acid radicals is possible since the time is too short and the temperature is below 200° C. Also, during the copolymerization step the temperature is too low for a diene reaction, and the copolymerization reaction between unsaturated dicarboxylic acid groups and >C=CH$_2$ groups is sufficiently faster than any possible reaction between drying oil acid groups and >C=CH$_2$ groups. Thus, by the present process side-reactions which increase the reaction-functionality of the reactants are avoided and a soluble final product is obtained. As noted above, the final ester is not permanently soluble and fusible since polymerization of the drying oil radicals ultimately causes gelation. However, esterification occurs before this change takes place, particularly when the esterification occurs under vacuum or in the presence of an inert gas such as carbon dioxide or nitrogen.

The products include reaction products ranging from oils to relatively hard resins depending upon the amount of copolymerized liquid monomer. They are soluble in esters, ketones and hydrocarbons, those containing less of the copolymerized liquid monomer being soluble in aliphatic hydrocarbons and those containing more thereof being soluble in aromatic hydrocarbons or mixtures of aromatic hydrocarbons and mineral spirits. The products are adapted for coating compositions and other uses such as printing inks, linoleum, oil cloth, or as cold-molding binders.

The following examples illustrate the invention.

*Example 1.*—A reactor equipped with agitator, thermometer and carbon dioxide-inlet was charged with 1405 g. (1.6 moles) of alkali refined linseed oil, 77.4 g. (0.8 mole) C. P. 95% glycerine, and 0.45 g. of litharge. The mixture was heated for 2 hours at 237° C. 898 g. (1.46 moles) of the diglyceride thus produced were reacted with 71.5 g. (0.73 mole) of maleic anhydride for 15 minutes at 165° C. 150 parts of the product were heated with 50 parts of distilled styrene under reflux with agitation for 7½ hours at 175–180° C. Vacuum generated by a water-aspirator was then applied to remove unreacted styrene (1 hour at 130–200° C.) and to cause esterification (2 hours at 200–230° C.). The product was a clear viscous amber-colored oil of acid number 7.2, and contained 18% reacted styrene.

*Example 2.*—1120 g. (4 moles) of distilled linseed oil acids were heated with 184.2 g. (2 moles) of C. P. glycerine for 10 hours at 185–215° C. (acid number=7). To 493 g. (0.8 mole) of the diglyceride formed, there were added 39.2 g. (0.4 mole) of maleic anhydride. Agitation was applied and the mixture was heated for 1 hour at 170° C. (acid number=42). A mixture of 120 parts of the half-ester thus formed and 96 parts of distilled styrene was refluxed for 6.2 hours at 155–200° C. in the presence of 0.4% added benzoyl peroxide. After heating under vacuum to remove unreacted styrene (15 minutes, 165–230° C.) and to cause esterification (1 hour at 230–235° C.) there was obtained a clear amber-colored semi-solid, of acid number 9, containing 41% reacted styrene. The product was dissolved 50% in mineral spirits, and to the solution was added a naphthenate drier to give 0.6% lead and 0.02% cobalt, based on constituents other than reacted styrene. A film of the resulting varnish dried to a tack-free condition in 4 hours. The 72-hour aged film was tough and flexible. When immersed in water at 25° C. for 72 hours, this film remained clear and showed only slight softening.

*Example 3.*—A mixture was made of 51.3 g. (0.524 mole) of maleic anhydride and 645 g. (1.048 moles) of linseed oil acids diglyceride, the latter being prepared as in Example 1. The mixture, under agitation, was brought to 170° C. in ½ hour and held at 170° C. for 15 minutes. (Acid number=48.) 100 parts of the resulting half-ester were mixed with 150 parts of alkali-washed styrene and 2.5 parts of benzoyl peroxide. The mixture, under agitation, was brought to 97° C. in 15 minutes and the temperature allowed to rise slowly to 127° C. over a period of 3 additional hours. It was necessary occasionally to apply a cold-water bath to the flask to control the exothermic reaction. An aspirator-vacuum was then applied and the temperature of the batch was slowly raised to 195° C. over a period of 3½ hours. The product thus obtained was a clear, tough, tack-free, somewhat rubbery solid of acid number 12, and reacted styrene content 52.5%. It was dissolved 35% in xylol, and to the solution was added naphthenate drier to give 0.5% lead and 0.1% manganese based on ingredients other than reacted styrene. A film of the resulting varnish dried tough and tack-free in 15 minutes at room temperature. The 72-hour aged film had good water- and alkali-resistance.

*Example 4.*—A mixture of 1072 g. (4 moles) of refined soy bean oil acids and 181 g. (1.33 moles) of technical pentaerythritol was placed in the reactor described in Example 1 and was brought to 180° C. in 2 hours, and over the next 11½ hours the temperature was gradually raised to 255° C. (Acid number=3.3.) A mixture of 515 g. (0.56 mole) of the monohydroxy ester thus produced and 27.6 g. (0.28 mole) of maleic anhydride was heated for 15 minutes at 170° C. to give a maleic half-ester of acid number 54. A mixture of 12 parts of this ester, 3 parts of alkali-washed styrene and 0.015 part benzoyl peroxide was heated for 4½ hours in an oil bath held at 120–127° C. A water-aspirator was then attached, the unreacted styrene was removed (15 minutes 25–240° C.) and the residue was additionally heated under vacuum for 2 hours at 240–245° C. The product, a clear viscous oil of acid number 17.5, had a reacted styrene content of 8.5%. The oil dried appreciably faster than bodied linseed oil.

*Example 5.*—840 g. (3 moles) of distilled linseed oil acids and 186 g. (3 moles) of technical ethylene glycol were placed in a 3-neck round bottom flask equipped with stirrer, thermometer and a steam-jacketed reflux condenser. The mixture was brought to 185° C. in 2 hours and held at 185–195° C. for 9½ hours. (Acid number=4.) The temperature was then lowered to 180° C., 146 g. (1.5 moles) of maleic anhydride were added, and the mixture was heated under agitation for 15 minutes at 160–170° C. (Acid number=69.)

Six parts (by weight) of the resulting acid-ester, 9 parts of alkali-washed styrene, and 0.15 part of benzoyl peroxide were heated under reflux conditions in an oil bath held at 120–127° C. During the first 15 minutes of heating there was a vigorous exothermic reaction and the mixture which was initially cloudy, became clear. Heating was continued for a total of 1½ hours at 120–127° C., oil bath temperature. Unreacted styrene was then removed under water-aspirator vacuum (15 minutes at 25°–235° C.) and the residue was subjected to additional heating under vacuum for 2 hours at 235–242° C. in order to esterify it. The product at 25° C. was a clear, somewhat tacky, semi-solid. The reacted styrene content was 45%.

The product was dissolved in xylol to a solids content of 33%, and naphthenate drier added (0.5% lead and 0.1% manganese calculated as metal on ingredients other than converted styrene). A film of the varnish thus prepared dried to a tack-free condition when exposed at room temperature for 5½ hours. The 72-hour aged film was flexible and exhibited good resistance to 3% aqueous sodium hydroxide solution.

Example 6.—804 g. (3 moles) of refined soybean oil acids and 186 g. (3 moles) of technical ethylene glycol were placed in a 3-neck flask equipped with stirrer, thermometer, carbon dioxide inlet, and steam-jacketed reflux condenser. The reactants were brought to 195° C. in 1½ hours and held for 7¼ hours at 195–205° C. The temperature was dropped to 180° C. and then 146 g. (1.5 moles) of maleic anhydride were added. The mixture was reacted under agitation for 15 minutes at 165°–170° C. Three parts (by weight) of the product were mixed with 12 parts of styrene and 0.15 part of benzoyl peroxide. The solution was heated for 1½ hours in an oil bath held at 125° C. In the initial quarter hour of heating, a vigorous exothermic reaction was observed.

Under vacuum supplied by a water-aspirator, the product was stripped of unreacted styrene (15 minutes at 25–240° C.) and heated additionally for 2 hours at 250° C. The end-product was a clear hard amber-colored resin of acid number 8.3, and reacted styrene content 71%.

Example 7.—A mixture was made of 14.7 g. (0.15 mole) of maleic anhydride and 185 g. (0.30 mole) of linseed oil acids diglyceride, the latter having been prepared as described in Example 1. The mixture was reacted for 15 minutes at 170° C. (acid number=48). 200 parts of the resulting acid-ester and 200 parts of distilled technical butyl methacrylate were heated under reflux with stirring for 11 hours at 160–180° C. At this stage the product was a clear, amber-colored oil of acid number 17. After removal of unreacted monomer under vacuum and additional heating for 1 hour at 230–290° C., and 2 hours at 290° C., there was obtained a clear amber-colored viscous oil having an acid number of 2 and a reacted methacrylate content of 40%.

A varnish was made by dissolving the product 50% in mineral spirits and adding drier to give 0.5% manganese based on constituents other than reacted butyl methacrylate. A film of the varnish was set to touch after 7 hours' exposure.

Example 8.—Linseed oil-acids diglyceride was prepared as in Example 1. A mixture of 203 g. (0.330 mole) of this diglyceride and 21.5 g. (0.165 mole) of itaconic acid was heated under agitation to 165° C. in 15 minutes and held at 165°–180° C. for ¾ hour. 100 g. of the acid-ester thus formed was mixed with 80 g. of distilled styrene. The mixture was heated under agitation for 5 hours at 140–180° C. (acid number=16.5). The unreacted styrene was removed under vacuum (½ hour at 130–200° C.) and the residue was additionally heated under vacuum for 1½ hours at 200–207° C. The product was an opalescent semi-solid which had an acid number of 15 and a converted styrene content of 36%. It was dissolved in mineral spirits and 0.5% lead and 0.1% manganese based on ingredients other than reacted styrene was added. After overnight exposure, a film of the varnish thus prepared was clear, tack-free and flexible, and had good abrasion resistance.

Example 9.—A mixture was made of 92.4 g. (0.15 mole) of linseed oil acids diglyceride (prepared as in Example 1) and 10.0 g. (0.075 mole) of monochloromaleic acid anhydride, and the mixture was heated under agitation for 15 minutes at 160–170° C. (acid number = 45). To the acid-ester thus prepared there was added distilled styrene to the amount of 81.8 g. (44.4% of total). The mixed ingredients were subjected to agitation and, under reflux conditions, the temperature was brought to 127° C. in 15 minutes, and gradually raised to 172° C. over a period of 9 hours. Under aspirator vacuum, unreacted styrene was removed (1 hour at 25–210° C.) and the residue was additionally heated for 2¼ hours at 210–235° C. The product was a slightly cloudy viscous oil having a converted styrene content of 37% and an acid number of 4.2.

It will be understood that it is intended to cover all changes and modifications of the examples of the invention herein chosen for the purpose of illustration which do not constitute departure from the spirit and scope of the invention.

I claim:

1. A method of making a soluble reaction product which is essentially the copolymer of a liquid monomeric unsaturated polymerizable compound containing a single $>C=CH_2$ group per molecule, and a polyhydric alcohol mixed ester of an alpha-unsaturated alpha-beta dicarboxylic acid and drying oil acids, which comprises the steps of: (a) heating, at below 200° C., a mixture of 1 mole of an alpha-unsaturated alpha-beta dicarboxylic anhydride and 2 moles of a hydroxy-compound $D_{n-1}POH$, to form an esterifiable mixture of equal moles of $D_{n-1}POH$ and the unsaturated dicarboxylic acid half-ester thereof, wherein P is the residue of an esterifiable polyhydric alcohol $P(OH)_n$ after loss of hydroxyl groups therefrom, $n$ is the number of hydroxyl groups in said polyhydric alcohol, and D is the acid radical of unpolymerized drying oil acids free from conjugated unsaturation; (b) adding a liquid monomeric unsaturated polymerizable compound in which the unsaturation is due to a single terminal ethylenic group $>C=CH_2$ and which is copolymerizable with said unsaturated dicarboxylic acid half-ester, and heating the mixture at below 200° C., to copolymerize said polymerizable compound with the unsaturated dicarboxylic acid half-ester, the proportion of monomeric compound in the mixture being from 5% to 90%; and then (c) heating the mixture at above 200° C., to form an ester between the $D_{n-1}POH$ compound and its copolymerized dicarboxylic acid half-ester.

2. A method of making a soluble copolymer of styrene and a polyhydric alcohol mixed ester of an alpha-unsaturated alpha-beta dicarboxylic acid and drying oil acids, which comprises the steps of: (a) heating, at below 200° C., a mixture of 1 mole of an alpha-unsaturated alpha-beta dicarboxylic anhydride and 2 moles of a hydroxy-compound $D_{n-1}POH$, to form an esterifiable mixture of equal moles of $D_{n-1}POH$ and the unsaturated dicarboxylic acid half-ester thereof, wherein P is the residue of an esterifiable polyhydric alcohol $P(OH)_n$ after loss of hydroxyl groups therefrom, $n$ is the number of hydroxyl groups in said polyhydric alcohol, and D is the acid radical of unpolymerized drying oil acids free from conjugated unsaturation; (b) adding styrene and heating the mixture at below 200° C., to copolymerize the styrene with the unsaturated dicarboxylic acid half-ester, the amount of styrene in the mixture being from 5% to 90%; and then (c) heating the mixture at above 200° C., to form an ester between the $D_{n-1}POH$ compound and its copolymerized dicarboxylic acid half-ester.

3. A method of making a soluble copolymer of styrene and a polyhydric alcohol mixed ester of maleic acid and drying oil acids, which comprises the steps of: (a) heating, at below 200° C., a mixture of 1 mole of maleic anhydride and 2 moles of a hydroxy-compound $D_{n-1}POH$, to form an esterifiable mixture of equal moles of $D_{n-1}POH$ and the maleic acid half-ester thereof, wherein P is the residue of an esterifiable polyhydric alcohol $P(OH)_n$ after loss of hydroxyl groups therefrom, $n$ is the number of hydroxyl groups in said polyhydric alcohol, and D is the acid radical of unpolymerized drying oil acids free from conjugated unsaturation; (b) adding styrene and heating the mixture at below 200° C., to copolymerize the styrene with the maleic acid half-ester, the amount of styrene in the mixture being from 5% to 90%; and then (c) heating the mixture at above 200° C., to form an ester between the $D_{n-1}POH$ compound and its styrene-copolymerized maleic half-ester.

4. A method of making a soluble copolymer of styrene and a polyhydric alcohol mixed ester of maleic acid and linseed oil acids, which comprises the steps of: (a) heating, at below 200° C., a mixture of 1 mole of maleic anhydride and 2 moles of a monohydroxyl-containing ester of a polyhydric alcohol and linseed oil acids, to form an esterifiable mixture of equal moles of the monohydroxyl-containing polyhydric alcohol ester and the maleic half-ester thereof; (b) adding styrene and heating the mixture at below 200° C., to copolymerize the styrene with the maleic half-ester, the amount of styrene in the mixture being from 5% to 90%; and then (c) heating the mixture at above 200° C., to form an ester between the monohydroxyl-containing polyhydric alcohol ester and its styrene-copolymerized maleic acid half-ester.

5. A method of making a soluble copolymer of styrene and a polyhydric alcohol mixed ester of maleic acid and soya bean oil acids, which comprises the steps of: (a) heating, at below 200° C., a mixture of 1 mole of maleic anhydride and 2 moles of a monohydroxyl-containing ester of a polyhydric alcohol and soya bean oil acids, to form an esterifiable mixture of equal moles of the monohydroxyl-containing polyhydric alcohol ester and the maleic half-ester thereof; (b) adding styrene and heating the mixture at below 200° C., to copolymerize the styrene with the maleic half-ester, the amount of styrene in the mixture being from 5% to 90%; and then (c) heating the mixture at above 200° C., to form an ester between the monohydroxyl-containing polyhydric alcohol ester and its styrene-copolymerized maleic acid half-ester.

6. A method of making a soluble copolymer of styrene and a glycerol mixed ester of maleic acid and linseed oil acids, which comprises the steps of: (a) heating, at below 200° C., a mixture of 1 mole of maleic anhydride and 2 moles of a monohydroxyl-containing ester of glycerol and linseed oil acids, to form an esterifiable mixture of equal moles of the monohydroxyl-containing ester and the maleic half-ester thereof; (b) adding styrene and heating the mixture at below 200° C., to copolymerize the styrene with the maleic half-ester, the amount of styrene in the mixture being from 5% to 90%; and then (c) heating the mixture at above 200° C., to form an ester between the monohydroxyl-containing glycerol ester and its styrene-copolymerized maleic half-ester.

7. A method of making a soluble copolymer of styrene and an ethylene glycol mixed ester of maleic acid and soya bean oil acids, which comprises the steps of: (a) heating, at below 200° C., a mixture of 1 mole of maleic anhydride and 2 moles of a monohydroxyl-containing ester of ethylene glycol and soya bean oil acids to form an esterifiable mixture of equal moles of the monohydroxyl-containing ester and the maleic half-ester thereof, (b) adding styrene and heating the mixture at below 200° C., to copolymerize the styrene with the maleic half-ester, the amount of styrene in the mixture being from 5% to 90%; and then (c) heating the mixture at above 200° C., to form an ester between said monohydroxyl-containing ethylene glycol ester and its styrene-copolymerized maleic half-ester.

8. A method of making a soluble copolymer of styrene and a pentaerythritol mixed ester of maleic acid and soya bean oil acids, which comprises the steps of: (a) heating, at below 200° C., a mixture of 1 mole of maleic anhydride and 2 moles of a monohydroxyl-containing ester of pentaerythritol and soya bean oil acids, to form an esterifiable mixture of equal moles of the monohydroxyl-containing ester and the maleic half-ester thereof; (b) adding styrene and heating the mixture at below 200° C., to copolymerize the styrene with the maleic half-ester, the amount of styrene in the mixture being from 5% to 90%; and then (c) heating the mixture at above 200° C., to form an ester between said monohydroxyl-containing pentaerythritol ester and its styrene-copolymerized maleic half-ester.

9. A coating composition comprising the ester of claim 11 dissolved in a volatile hydrocarbon solvent therefor.

10. A coating composition comprising the ester of claim 12 dissolved in a volatile hydrocarbon solvent therefor.

11. A soluble ester of (A) a monohydroxyl-containing polyhydric alcohol-drying oil acids ester having the formula $D_{n-1}POH$, wherein P is residue of an esterifiable polyhydric alcohol $P(OH)_n$ after removal of all hydroxyl groups therefrom, $n$ is the number of hydroxyl groups in said polyhydric alcohol and D is the acid radical of unpolymerized drying oil acids free from conjugated unsaturation, and (B) the polymer resulting from the conjoint polymerization of a mixture of (a) an unsaturated alpha-beta dicarboxylic acid half-ester of said monohydroxyl-containing ester, and (b) a liquid monomeric unsaturated polymerizable compound in which the unsaturation is due to a single terminal ethylenic linkage $>C=CH_2$ and which is copolymerizable with said unsaturated dicarboxylic acid half-ester, the amount of monomeric compound being from 5% to 90% of the total composition; as produced by the method of claim 1.

12. A soluble ester of (A) a monohydroxyl-containing polyhydric alcohol-drying oil acids ester having the formula $D_{n-1}POH$, wherein P is residue of an esterifiable polyhydric alcohol P(OH)$_n$ after removal of all hydroxyl groups therefrom, $n$ is the number of hydroxyl groups in said polyhydric alcohol and D is the acid radical of unpolymerized drying oil acids free from conjugated unsaturation, and (B) the polymer resulting from the conjoint polymerization of a mixture of (a) an unsaturated alpha-beta dicarboxylic acid half-ester of said monohydroxyl-containing ester, and (b) styrene, the amount of styrene being from 5% to 90% of the total composition; as produced by the method of claim 2.

13. A soluble copolymer of styrene and a polyhydric alcohol mixed ester of maleic acid and drying oil acids, as produced by the method of claim 3.

14. A soluble copolymer of styrene and a polyhydric alcohol mixed ester of maleic acid and linseed oil acids, as produced by the method of claim 4.

15. A soluble copolymer of styrene and a polyhydric alcohol nixed ester of maleic acid and soya bean oil acids, as produced by the method of claim 5.

16. A soluble copolymer of styrene and a glycerol mixed ester of maleic acid and linseed oil acids, as produced by the method of claim 6.

17. A soluble copolymer of styrene and an ethylene glycol mixed ester of maleic acid and soya bean oil acids, as produced by the method of claim 7.

18. A soluble copolymer of styrene and a pentaerythritol mixed ester of maleic acid and soya bean oil acids, as produced by the method of claim 8.

FRANK B. ROOT.

REFERENCES CITED

The following references are of record in the file of this patent:

UNITED STATES PATENTS

| Number | Name | Date |
|---|---|---|
| 2,392,710 | Wakeford et al. | Jan. 8, 1940 |